(12) United States Patent
Nagasaka et al.

(10) Patent No.: US 7,118,293 B2
(45) Date of Patent: Oct. 10, 2006

(54) OPTICAL MODULE AND MANUFACTURING METHOD OF THE SAME, OPTICAL COMMUNICATION DEVICE, OPTO-ELECTRICAL HYBRID INTEGRATED CIRCUIT, CIRCUIT BOARD, AND ELECTRONIC APPARATUS

(75) Inventors: Kimio Nagasaka, Nirasaki (JP); Takeo Kaneko, Misato-mura (JP); Akira Miyamae, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 10/777,379

(22) Filed: Feb. 13, 2004

(65) Prior Publication Data
US 2004/0202477 A1    Oct. 14, 2004

(30) Foreign Application Priority Data
Feb. 17, 2003 (JP) ............................ 2003-038546

(51) Int. Cl.
*G02B 6/36* (2006.01)
(52) U.S. Cl. .......................................... 385/89; 385/93
(58) Field of Classification Search ............ 385/88–93
See application file for complete search history.

(56) References Cited

U.S. PATENT DOCUMENTS

| | | | |
|---|---|---|---|
| 3,871,935 A | 3/1975 | Gloge et al. |
| 4,666,238 A | 5/1987 | Borsuk et al. |
| 4,732,599 A | 3/1988 | Bennion |
| 4,971,422 A | 11/1990 | Herse |
| 5,168,537 A | 12/1992 | Rajasekharan et al. |
| 5,257,334 A | 10/1993 | Takahashi |
| 5,369,529 A | 11/1994 | Kuo et al. |
| 5,708,743 A | 1/1998 | DeAndrea et al. |
| 5,764,832 A | 6/1998 | Tabuchi |

(Continued)

FOREIGN PATENT DOCUMENTS

DE     195 10 559 C1    7/1996

(Continued)

OTHER PUBLICATIONS

"Nikkei Electronics", Nikkei BP Publications, Inc., Dec. 3rd, 2001 issue, pp. 112-117, 121 and 122 (with partial English-language translation).

(Continued)

*Primary Examiner*—Michelle Connelly-Cushwa
*Assistant Examiner*—Tina M. Wong
(74) *Attorney, Agent, or Firm*—Oliff & Berridge, PLC

(57) ABSTRACT

To provide an optical module capable of miniaturization, the optical module, to which an optical plug provided at one end of an optical transmission path is attached, so as to transmit and receive signal light via the optical transmission path for information communication, includes: a transparent substrate having light transmittance property with respect to a wavelength of used signal light; an optical socket, which is arranged on one surface side of the transparent substrate and to which the optical plug is attached; an optical element, which is arranged on the other surface side of the transparent substrate and emits the signal light to the one surface side of the transparent substrate according to a supplied electrical signal, or generates an electrical signal according to the intensity of the signal light supplied from the other surface of the transparent substrate; and a reflective portion, which is arranged on the other surface of the transparent substrate and changes a path of the signal light emitted from the optical element at substantially 90 degrees to guide it to the optical transmission path, or changes a path of the signal light emitted from the optical transmission path at substantially 90 degrees to guide it to the optical element.

17 Claims, 13 Drawing Sheets

U.S. PATENT DOCUMENTS

| | | | |
|---|---|---|---|
| 6,012,852 A | 1/2000 | Kadar-Kallen et al. | |
| 6,128,134 A | 10/2000 | Feldmann et al. | |
| 6,188,495 B1* | 2/2001 | Inoue et al. | 398/139 |
| 6,254,285 B1* | 7/2001 | Grumm et al. | 385/88 |
| 6,318,902 B1 | 11/2001 | Igl et al. | |
| 6,374,004 B1 | 4/2002 | Han et al. | |
| 6,477,303 B1* | 11/2002 | Witherspoon | 385/52 |
| 6,488,417 B1* | 12/2002 | Kropp | 385/88 |
| 6,491,447 B1* | 12/2002 | Aihara | 385/92 |
| 6,556,747 B1* | 4/2003 | Ouali et al. | 385/33 |
| 6,846,113 B1* | 1/2005 | Yeh et al. | 385/88 |
| 6,869,229 B1* | 3/2005 | Reedy et al. | 385/88 |
| 6,901,185 B1* | 5/2005 | Sasaki et al. | 385/33 |
| 2002/0001428 A1 | 1/2002 | Schroedinger | |
| 2002/0150354 A1 | 10/2002 | Zaborsky et al. | |
| 2003/0007753 A1* | 1/2003 | Hurt et al. | 385/92 |
| 2004/0033016 A1* | 2/2004 | Kropp | 385/31 |

FOREIGN PATENT DOCUMENTS

| | | |
|---|---|---|
| DE | 195 19 486 A1 | 11/1996 |
| DE | 199 10 164 A1 | 9/2000 |
| EP | 0 637 765 A2 | 2/1995 |
| EP | 1 109 041 A1 | 6/2001 |
| JP | 63-56617 | 3/1988 |
| JP | 5-297245 | 11/1993 |
| JP | A 7-49437 | 2/1995 |
| JP | 10-10374 | 1/1998 |
| JP | 2001-174671 | 6/2001 |
| JP | 2003-014987 | 1/2003 |
| WO | WO 99/40578 | 8/1999 |
| WO | WO 01/27676 A1 | 4/2001 |
| WO | WO 01/33262 A2 | 5/2001 |

OTHER PUBLICATIONS

European Search Report.

* cited by examiner

OPTICAL MODULE AND MANUFACTURING METHOD OF THE SAME, OPTICAL COMMUNICATION DEVICE, OPTO-ELECTRICAL HYBRID INTEGRATED CIRCUIT, CIRCUIT BOARD, AND ELECTRONIC APPARATUS

BACKGROUND OF THE INVENTION

1. Field of Invention

The present invention relates to a device, components, or the like for use in information communication (signal transmission) by optical signals between a plurality of devices or inside of a device.

2. Description of Related Art

In recent years, a signal transfer rate between circuit chips included in various devices, or between circuit boards has increased, and problems such as crosstalk between signal lines, noise radiation, impedance mismatch and high power consumption have become critical. Consequently, optical communication has started to be introduced in signal transmission between circuit chips inside of a device, between modules or the like. Therefore, a technique of transmitting an optical signal via an optical transmission path, such as optical fiber (tape fiber) or optical waveguide for communication in place of a conventional method of transmitting an electrical signal via metal wiring has been employed. For example, such a technique is described in "NIKKEI ELECTRONICS", Nikkei BP Publications, Inc., Dec. 3rd, 2001 issue, pages 112–122.

When performing optical communication, it is important to perform mutual alignment (optical-axis alignment) with higher precision at coupling points existing on an optical signal transmission path, such as between optical fibers and between an optical fiber and a light-emitting element, or a light-receiving element to avoid an increase of optical coupling loss. In order to satisfy such a demand, various techniques are employed. One of these techniques is described, for example, in Japanese laid-open patent publication No. 7-49437.

In case of optical connectors described in Japanese laid-open patent publication No. 7-49437, when one connector is provided with a fitting pin and the other connector is provided with a fitting hole into which the fitting pin is inserted, there is a disadvantage that miniaturization is difficult.

Furthermore, a photo-electric conversion module described in "NIKKEI ELECTRONICS", Nikkei BP Publications, Inc., Dec. 3rd, 2001 issue, pages 112–122 has a configuration in which an end surface of an optical fiber (optical transmission path) is directly arranged on a light-emitting surface or a light-receiving surface of an optical element via a small-sized connector (optical plug). Consequently, when the small-sized connector is removed, the light-emitting/light-receiving surface of the optical element and the end surface of the optical fiber are exposed, which is apt to cause defects, such as damage of the light-emitting surface or the like and adhesion of foreign materials.

SUMMARY OF THE INVENTION

Accordingly, the present invention provides an optical module capable of miniaturization.

Furthermore, the present invention provides an optical module capable of protecting a light-emitting surface or light-receiving surface of an optical element with a simple configuration.

In order to address the above, an optical module according to an aspect of the present invention, to which an optical plug provided at one end of an optical transmission path is attached, so as to transmit and receive signal light via the optical transmission path for information communication, includes: a transparent substrate having light transmittance property with respect to a wavelength of used signal light; an optical socket, which is arranged on the one surface side of the transparent substrate and to which the optical plug is attached; an optical element, which is arranged on the other surface side of the transparent substrate and emits the signal light to the one surface side of the transparent substrate according to a supplied electrical signal, or generates an electrical signal according to the intensity of the signal light supplied from the one surface side of the transparent substrate; and a reflective portion, which is arranged on the one surface side of the transparent substrate and changes a path of the signal light emitted from the optical element at substantially 90 degrees to guide it to the optical transmission path, or changes a path of the signal light emitted from the optical transmission path at substantially 90 degrees to guide it to the optical element.

Because the optical module has such a configuration, in which the signal light emitted from the optical element and the signal light emitted from the optical transmission path are reflected at substantially 90 degrees to achieve optical coupling, the longitudinal direction of the optical transmission path can be arranged along the surface of the transparent substrate, which enables miniaturization of the optical module. In particular, because space saving in the thickness direction of the transparent substrate can be achieved, it is preferable for a case when the optical module according to an aspect of the present invention is used to construct an opto-electrical hybrid circuit. Furthermore, because the optical module has a configuration, in which a light-emitting surface/light-receiving surface of the optical element face the transparent substrate, the light-emitting surface, light-receiving surface or the like can be protected with a simple structure.

The above-described reflective portion may be formed in the optical socket. The optical socket including the reflective portion may be integrally molded using resin or the like. Thereby, the simplification of the structure can reduce the number of components and simplify its manufacturing process.

Furthermore, the optical module may include a first lens, which converges the signal light emitted from the optical element to guide it to the reflective portion, or converges the signal light, emitted from the optical transmission path and reflected by the reflective portion, to guide it to the optical element. This can enhance optical coupling efficiency.

The above-described first lens may be formed in the optical socket. The optical socket including the first lens may be integrally molded using resin or the like. Thereby, the simplification of the structure can reduce the number of components and simplify its manufacturing process. Optical-axis alignment at assembly also becomes easy.

Furthermore, the first lens may be formed on the transparent substrate. In this case, a manufacturing step of cutting and dividing a base material substrate after a batch formation of a plurality of first lenses on the base material substrate can be employed.

Furthermore, the optical module may include a second lens, which converges the signal, emitted from the optical element and reflected by the reflective portion, to guide it to the optical transmission path, or converges the signal light emitted from the optical transmission path to guide it to the reflective portion. This can enhance optical coupling efficiency.

The above-described second lens may be formed in the optical plug or the optical socket. The optical plug or the optical socket including the second lens may be integrally formed using resin or the like. Thereby, the simplification of the structure can reduce the number of components and simplify its manufacturing process. Optical-axis alignment at assembly also becomes easy.

The above-described first lens may converge the signal light emitted from the optical element into substantially parallel light, and the above-described second lens may converge the signal light emitted from the optical transmission path into substantially parallel light. Thereby, the optical plug and the optical socket are coupled in parallel light (infinity system), which allows a large fitting tolerance. Accordingly, requirement for accuracy in manufacturing and designing becomes low, which is advantageous.

Furthermore, the optical socket may have guide surfaces to position the optical plug. Because this makes it unnecessary to provide a positioning pin or a fitting hole corresponding to the pin, a decrease of the components in number and miniaturization of the optical socket and the optical plug can be achieved. Machining of the optical socket and the optical plug also becomes easy.

The above-described guide surfaces may include two surfaces which are substantially parallel to each other and substantially orthogonal to the other surface of the transparent substrate. The two surfaces and the other surface of the transparent substrate enable the optical plug to be positioned precisely.

Furthermore, the optical module may further include a pressing device to press the optical plug to the other surface side of the transparent substrate. As for the pressing device, for example, a leaf spring can be used. This can make a position of the optical plug in the vertical direction (orthogonal direction with respect to the transparent substrate) more stable.

Furthermore, the above-described guide surfaces may include two surfaces which are substantially parallel to each other and substantially orthogonal to the other surface of transparent substrate, and include one surface which is substantially parallel to the other surface of the transparent substrate. These surfaces and the other surface of the transparent substrate enable the optical plug to be positioned precisely.

Furthermore, the above-described guide surfaces may include two surfaces substantially orthogonal to each other and arranged at an angle of substantially 45 degrees with respect to the other surface of the transparent substrate. In addition, in this case, each of the two surfaces may have a projection portion to bias the optical plug. This enables the optical plug to be positioned precisely.

Furthermore, the optical module may further include a locking device to hold a state, in which the optical plug is fitted into the optical socket. As for the locking device, for example, a hook formed using an elastic body, such as a leaf spring can be used. This can securely reduce the occurrence of or prevent the optical plug from coming off the optical socket or being displaced.

Furthermore, the optical socket may have a guide groove to position the optical plug. Using the guide groove enables the optical plug to be positioned precisely.

Furthermore, the above-described guide groove may include a surface substantially parallel to the one surface of the transparent substrate, and a surface substantially orthogonal to the one surface of the transparent substrate, and penetrates from one end side of the optical socket to the other end side of the optical socket. This can make the insertion of the optical plug into the optical socket more smoothly.

Furthermore, an aspect of the present invention provides a manufacturing method of an optical module, to which an optical plug provided at one end of an optical transmission path is attached, so as to transmit and receive signal light via the optical transmission path for information communication. The method includes forming a wiring layer in each of a plurality of regions on one surface of a transparent substrate having light transmittance property; arranging an optical element on the other surface of the transparent substrate corresponding to each wiring layer; mounting an optical coupling component corresponding to each optical element on the one surface of the transparent substrate; and cutting and dividing the transparent substrate into a plurality of regions.

The "optical coupling component" indicates a component to optically couple the optical transmission path (for example, optical fiber or the like) supported by the above-described optical plug and the optical element, and the optical socket, for example, corresponds to the optical coupling component. The manufacturing method of an aspect of the present invention enables a small-sized optical module excellent in protecting a light-emitting/light-receiving surface of an optical element or the like to be manufactured at low cost.

Furthermore, an aspect of the present invention provides an optical communication device (optical transceiver) including the above-described optical module. Such an optical communication device according to an aspect of the present invention can be used for various electronic apparatus, such as a personal computer, a PDA (personal digital assistance) or the like, which perform information communication with external devices using light as a transmission medium. The "optical communication device" herein includes not only a device, having both configurations for transmission of signal light (light-emitting element or the like) and receiving of signal light (light-receiving element or the like), but also a device, having only the configuration for transmission of signal light (so-called optical transmission module) or having only the configuration for receiving of signal light (so-called optical receiving module).

Furthermore, an aspect of the present invention provides an opto-electrical hybrid integrated circuit including the above-described optical module and a circuit board including the above-described optical module and an optical waveguide having a role of the transmission of signal light. Such a circuit board may be referred to as an "opto-electrical hybrid board".

Furthermore, an aspect of the present invention provides an electronic device including the above-described optical module. Specifically, the electronic device according to an aspect of the present invention includes not only a case having the above-described optical module itself, but also a case having any of the above-described optical communication devices, opto-electrical hybrid integrated circuit, and circuit board, which include the optical module. The "electronic device" herein indicates a general apparatus, which implements a specific function using an electronic circuit or the like, whose configuration is not particularly limited, but various apparatus, such as a personal computer, a PDA (personal digital assistance), and an electronic data book are exemplified. In these apparatus, the optical module, optical communication device, opto-electrical hybrid integrated circuit, or circuit board of an aspect of the present invention can be used for information communication inside of one apparatus or information communication with an external apparatus.

DETAILED DESCRIPTION OF PREFERRED EMBODIMENTS

Hereinafter, exemplary embodiments according to the present invention will be described referring to the figures.

First Exemplary Embodiment

Figure 1A:
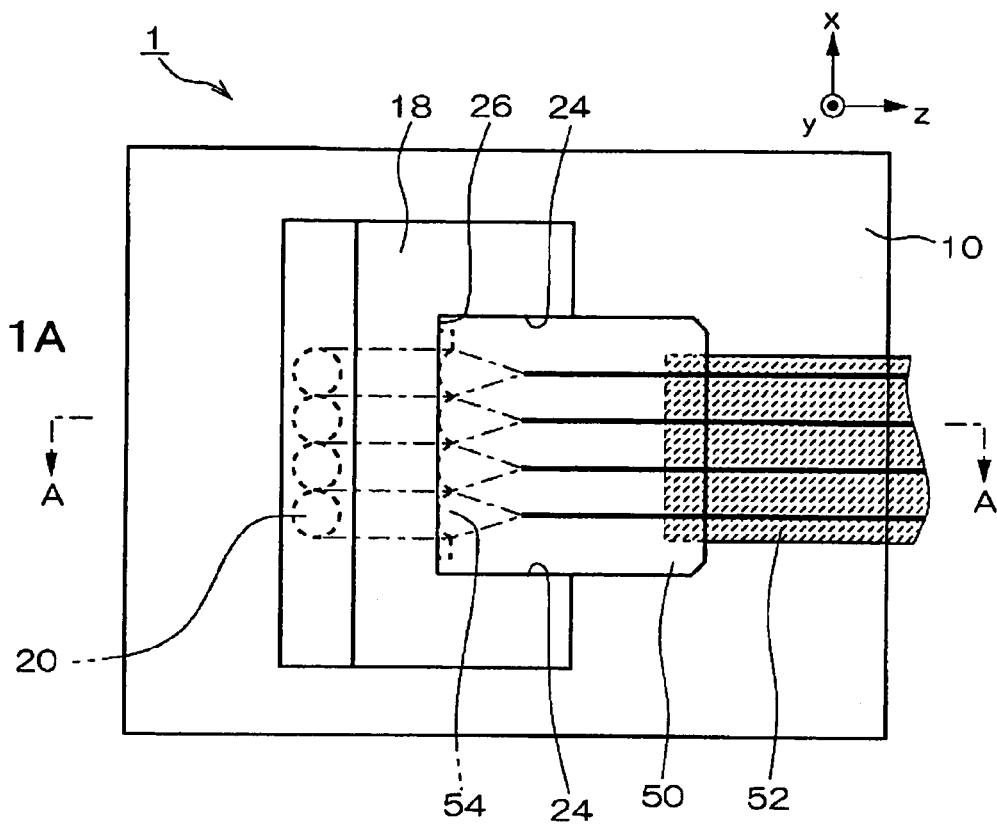
FIGS. 1(A) and 1(B) are views illustrating a configuration of an optical module according to a first exemplary embodiment.
Figure 1B:
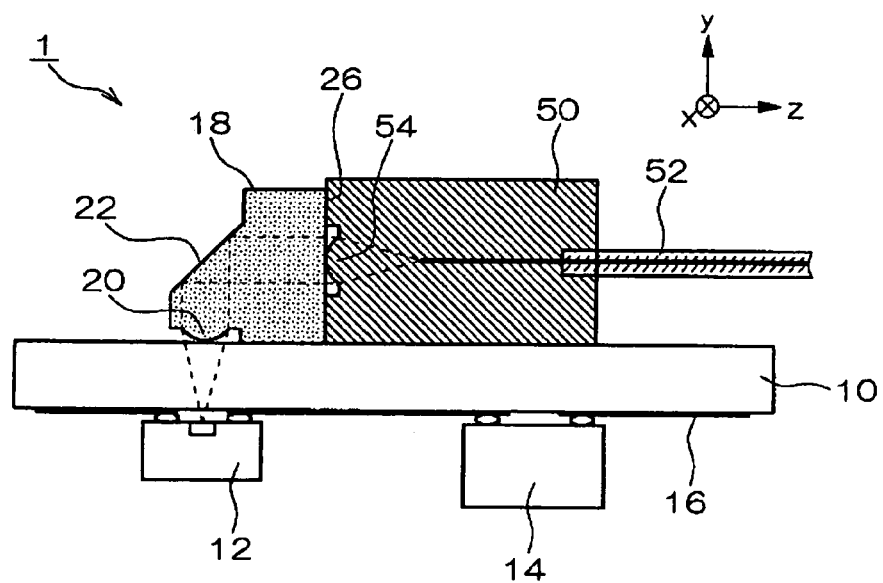

FIGS. 1(A) and 1(B) are views illustrating a configuration of an optical module according to a first exemplary embodiment. FIG. 1(A) is a plan view of the optical module according to the present exemplary embodiment. FIG. 1(B) is a cross sectional view taken along the plane A—A of FIG. 1(A). An optical module 1 shown in FIGS. 1(A) and 1(B) is mounted with an optical plug 50, which is provided at one end of a tape fiber 52 serving as an optical transmission path, and transmits and receives signal light via the tape fiber 52 for information communication. The optical module 1 includes a transparent substrate 10, an optical element 12, an electronic circuit 14, a wiring layer 16, an optical socket 18, a lens 20, and a reflective portion 22.

The transparent substrate 10 has light transmittance property with respect to the wavelength of used light and supports each element constituting the optical module 1. For example, in the case where the wavelength of light emitted from, or received by, the optical element 12 is equivalent or close to that of visible light (for example, 850 nm), the transparent substrate 10 may be made of glass, plastic or the like. Alternatively, in the case where the emitted light has a comparatively long wavelength (for example, 1300 nm to 1500 nm), the transparent substrate 10 may be made of silicon, germanium, or the like.

The optical element 12, which emits signal light according to a driving signal supplied from the electronic circuit 14, or generates an electrical signal according to the intensity of received signal light, is arranged at a predetermined position on a back surface of the transparent substrate 10 with a light-emitting surface or light-receiving surface of the optical element facing the transparent substrate 10. The optical element 12 has the light-emitting surface or light-receiving surface arranged in an opening provided at the wiring layer 16 on the transparent substrate 10 so that a light signal is emitted or enters through the opening and the transparent substrate 10. For example, in the case where the optical module 1 shown in FIGS. 1(A) and 1(B) is used as the information transmission side, a light-emitting element, such as VCSEL (vertical-cavity surface emitting laser), is used as the optical element 12. Alternatively, in the case where the optical module 1 is used as the information receiving side, a light-receiving element is used as the optical element 12. According to the present exemplary embodiment, a configuration including four optical elements is exemplified, but the number of the optical element 12 is not limited to this and, for example, one optical element may be used.

The electronic circuit 14 includes a driver for driving the optical element 12 or the like and is arranged at a predetermined position on the back surface of the transparent substrate 10. The electronic circuit 14 is coupled to the optical element 12 via the wiring layer 16 formed on the transparent substrate 10, and further coupled to other circuit elements, circuit chips, external devices or the like (not shown), as required.

The wiring layer 16 is provided on the back surface side of the transparent substrate 10 using electrical conductor layer made of copper or the like, and subjected to patterning of a predetermined shape. The wiring layer 16 takes charge of electrical coupling between the optical element 12, the electronic circuit 14, other circuit elements, or the like.

The optical socket 18 is arranged on the front surface side of the transparent substrate 10, to which the optical plug 50 is attached. For example, the socket is formed using glass, plastic or the like. Furthermore, the optical socket 18 has guide surfaces to position the optical plug 50. Specifically, the guide surfaces include two surfaces 24 substantially parallel to each other and substantially orthogonal to the top surface of the transparent substrate 10, and one surface 26 substantially orthogonal to these surfaces 24 and substantially orthogonal to the top surface of the transparent substrate 10. In addition, the optical plug 50 is provided with abutting surfaces corresponding to these guide surfaces.

The above-described two surfaces 24 provided in the optical socket 18 are substantially parallel with respect to a Y-Z plane, and by forming a distance between these surfaces 24 with high accuracy, positioning of the optical plug 50 inserted into the optical socket 18 is performed with respect to a position in the X axis direction and an arranging angle within an X-Z plane. Furthermore, the above-described surface 26 is substantially parallel with respect to an X-Y plane, and by abutting one end of the optical plug 50 to the surface 26, positioning of the optical plug 50 in the Z axis direction is made. At this time, making the distance between the above-described surfaces 24 slightly shorter than the width of a part of the optical plug 50 that is inserted into the optical socket 18 (length in the X axis direction) can reduce or prevent displacement of the plug 50 after attaching it. Alternatively, a device to prevent the displacement of the optical plug 50 may be provided. Configuration examples providing the displacement preventing device will be described later.

The lens 20 is formed integrally with the optical socket 18, converging signal light emitted from the optical element 12 to guide it to the reflective portion 22 as substantially parallel light, and converging signal light, emitted from the tape fiber 52 and reflected by the reflective portion 22, to guide it to the optical element 12 as substantially parallel light. The lens 20 corresponds to the "first lens".

The reflective portion 22 changes a path of the signal light converged by the lens 20 at substantially 90 degrees to guide it to the tape fiber 52, and changes a path of the signal light emitted from the tape fiber 52 at substantially 90 degrees to guide it to the optical element 12. The reflective portion 22 is formed integrally with the optical socket 18 as a surface (reflective surface) arranged at an angle of substantially 45 degrees with respect to an optical axis of the optical element 12 (a main propagation direction of the signal light). At this time, by setting a refractive index of a material composing the optical socket 18 at about 1.5, the signal light entering the reflective portion 22 can be totally reflected, with which the path of the signal light can be changed by substantially 90 degrees. Alternatively, by providing a metal layer, dielectric multilayer or the like at the inclined surface of an angle of substantially 45 degrees formed in the optical socket 18, the reflective portion 22 may be formed.

The optical plug 50 to be attached to the above-described optical socket 18 supports the tape fiber 52 in such a manner as to make the extending direction of the tape fiber 52 (extending direction of a core) substantially parallel to the top surface of the transparent substrate 10. The optical plug 50 is detachable from the optical socket 18. As an example, the tape fiber 52 having four cores is illustrated, but the tape fiber is not limited to this example and a tape fiber with a desired number of cores (including one core) can be used. Furthermore, as an example of the optical transmission path, a tape fiber composed in layer form is illustrated. But the tape fiber is not limited to this and an optical transmission path, such as a general optical fiber can also be used.

In addition, the optical plug 50 according to the present exemplary embodiment is provided with a plurality of lenses 54 on one end thereof abutting on the optical socket 18. These lenses 54 converge the signal light, emitted from the optical element 12 and reflected by the reflective portion 22, to guide it to the tape fiber 52 as substantially parallel light, and converge the signal light emitted from the tape fiber 52 to guide it to the reflective portion 22 as substantially parallel light. The lenses 54 correspond to the "second lens". The second lens can take various configurations in addition to the configuration of being formed in the optical plug 50, and specific examples thereof will be described later.

Figure 2A:
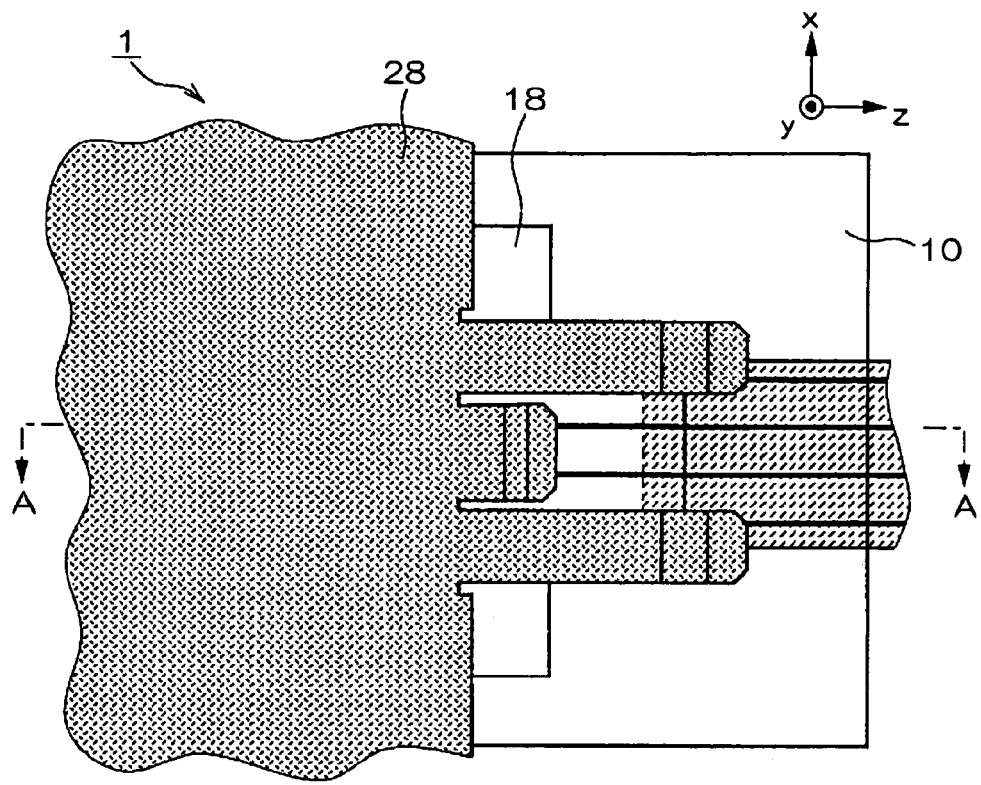
FIGS. 2(A) and 2(B) are views illustrating a configuration example in a case where a member to prevent displacement of an optical plug is provided.
Figure 2B:
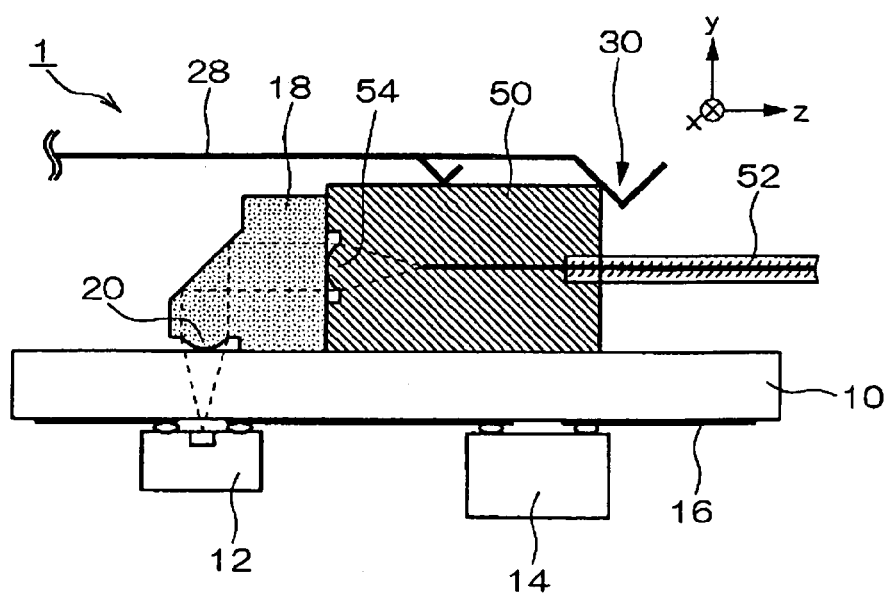

FIGS. 2(A) and 2(B) to views illustrating a configuration example in the case where a member to securely prevent displacement of the optical plug 50 is provided. As shown in the figures, a leaf spring 28 is arranged on the upper side of the optical plug 50 to press the optical plug 50 toward the transparent substrate 10 side. This allows the optical plug 50 to be positioned more securely with respect to a position in the Y axis direction, an angle within the X-Y plane, and an angle within the Y-Z plane of the optical plug 50 by setting the top surface of the transparent substrate 10 as a reference, thereby a relative position and posture of the optical plug 50 are determined. The leaf spring 28 corresponds to the "pressing device". Furthermore, a hook portion 30 is provided on one end of the leaf spring 28, which holds a fitting state of the optical plug 50 and the optical socket 18 while reducing or preventing separation or displacement of the optical plug 50. The leaf spring 28 may be supported, for example, by the transparent substrate 10, and, furthermore, may be supported by a housing or the like of various devices including the optical module 1 of the present exemplary embodiment (specific examples will be described later). The hook portion 30 corresponds to the "locking device".

The optical module 1 according to the present exemplary embodiment has such a configuration. Next an exemplary manufacturing method of the optical module 1 is described referring to the figures.

Figure 3A:
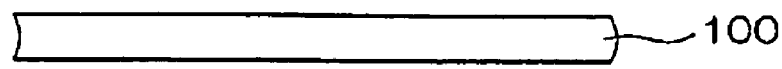
FIGS. 3(A)–3(E) are views illustrating the manufacturing steps of the optical module according to the first exemplary embodiment.
Figure 3B:

FIGS. 3(A)–3(E) and 4 are views illustrating the manufacturing steps of the optical module 1 according to the present exemplary embodiment. First, as shown in FIG. 3(A), a base material substrate 100 is prepared, which is a base material from which a plurality of transparent substrates 10 are to be cut out later. Then, as shown in FIG. 3(B), a conductive material, such as aluminum, copper or the like is deposited on the surface of the base material substrate 100 by using the sputtering method, electroforming or the like to form a metal layer (conductive layer). The metal layer is subjected to patterning corresponding to a desired circuit to form the wiring layer 16. The wiring layer 16 is formed in each sub-region of the base material substrate 100. Thus, it is preferable in view of mass production to form a plurality of wiring layers each having a unit wiring pattern at a plurality of positions in a batch way.

Figure 3C:
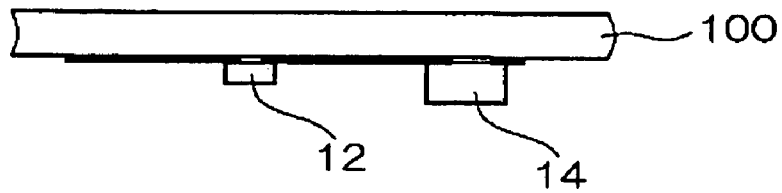

Next, as shown in FIG. 3(C), circuit elements, such as the optical element 12 and the electronic circuit 14 are mounted on the one surface side of the base material substrate 100. The mounting can be performed using flip chip bonding, wire boding, solder reflow, or the like. As described above, in the case where unit wiring patterns are formed at a plurality of positions of the base material substrate 100 in a batch way, in the step shown in FIG. 3(C), a plurality of optical elements are arranged on the one surface of the base material substrate 100 corresponding to the respective unit wiring patterns.

Figure 3D:
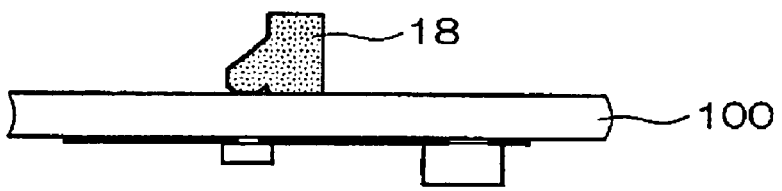

Next, as shown in FIG. 3(D), the optical socket 18 is mounted on the other surface side of the base material substrate 100 at positions corresponding to the optical element 12. This mounting is performed by applying adhesive to the surface of the optical socket 18 and the surface of the base material substrate 100 that face each other, or applying adhesive to either of the surfaces, followed by placing the optical socket 18 on the base material substrate 100. As the adhesive, substances that are cured later by undergoing some process (for example, light irradiation) may be used. The optical socket 18 is adjusted in position to be placed in such a manner that the optical axis of the lens 20 substantially coincides with that of the optical element 12.

Figure 4:
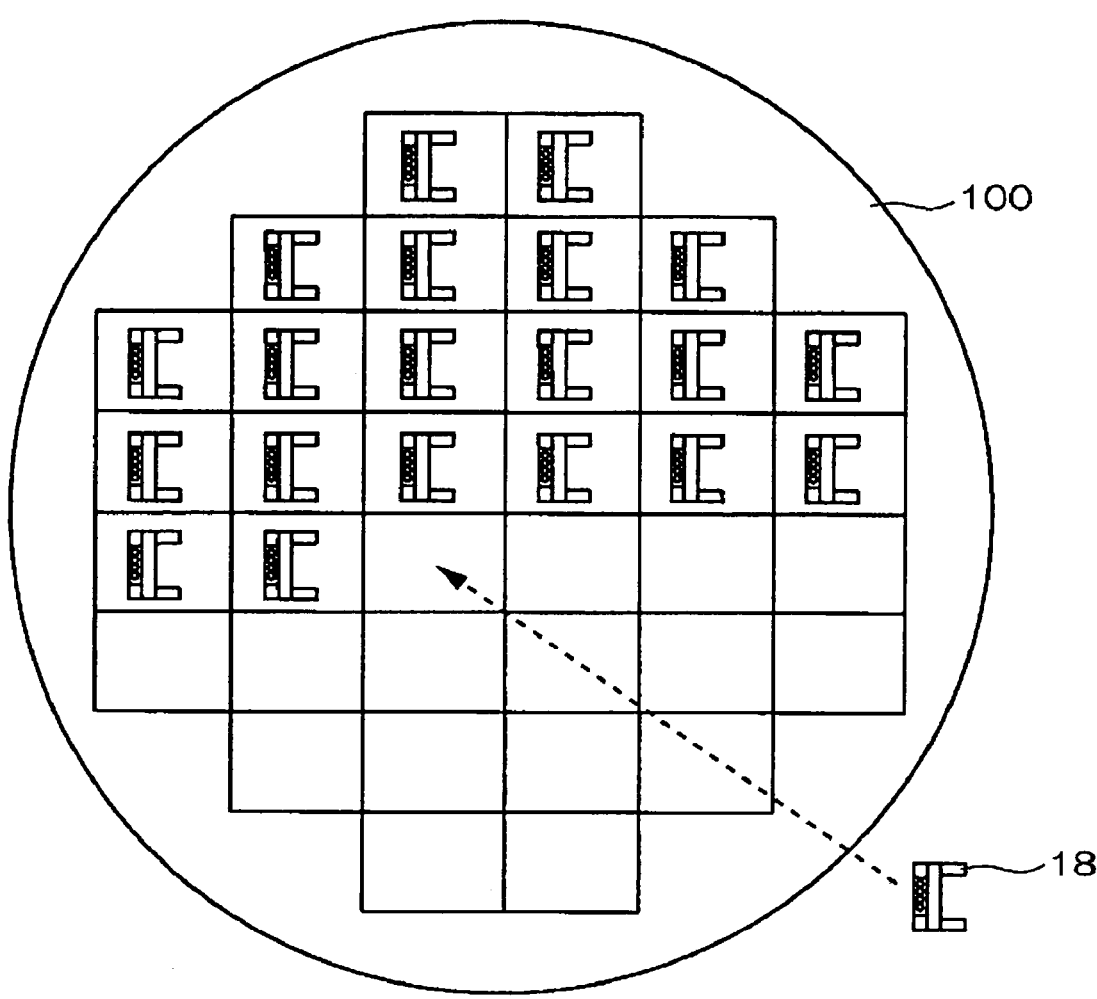
FIG. 4 is a view illustrating the manufacturing step of the optical module according to the first exemplary embodiment.

After the alignment of the optical socket 18 is completed, the adhesive is solidified to fix the optical socket 18 on the base material substrate 100. As the adhesive, for example, light-cured resin, thermosetting resin or the like can be used. As shown in FIG. 4, placing, adjusting position, and fixing the optical socket 18 is repeated for a required number of times. Then, the optical socket 18 is mounted to a plurality of sub-regions of the base material substrate 100 to compose the optical module 1.

Figure 3E:
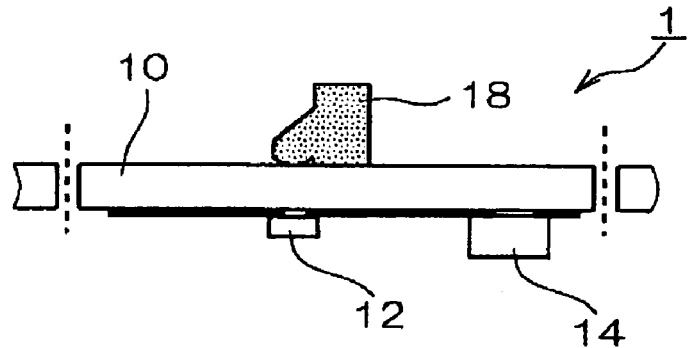

Thereafter, as shown in FIG. 3(E), the base material substrate 100 is cut into a plurality of sub-regions to obtain a number of optical modules that are each to be the optical module 1. Optical modules according to other exemplary embodiments described later can be manufactured in a similar method.

As described above, because the optical module 1 according to the present exemplary embodiment has the configuration, in which the signal light emitted from the optical element 12 and the signal light emitted from the tape fiber (optical transmission path) 52 are reflected at substantially 90 degrees to achieve optical coupling, the longitudinal direction of the tape fiber 52 can be arranged along the surface of the transparent substrate 10. This enables miniaturization of the optical module. In particular, because space saving in the thickness direction of the transparent substrate 10 can be achieved, it is preferable for the case where the optical module according to an aspect of the present invention is used to compose an opto-electrical hybrid circuit. Furthermore, because the optical module has the configuration, in which the light-emitting surface/light-receiving surface of the optical element 12 face the transparent substrate 10, the light-emitting surface, light-receiving surface or the like can be protected with a simple structure. In addition, the manufacturing method according to the present exemplary embodiment enables a small-sized optical module excellent in protection of the light-emitting surface/light-receiving surface of the optical element to be manufactured at lower cost.

Second Exemplary Embodiment

Figure 5A:
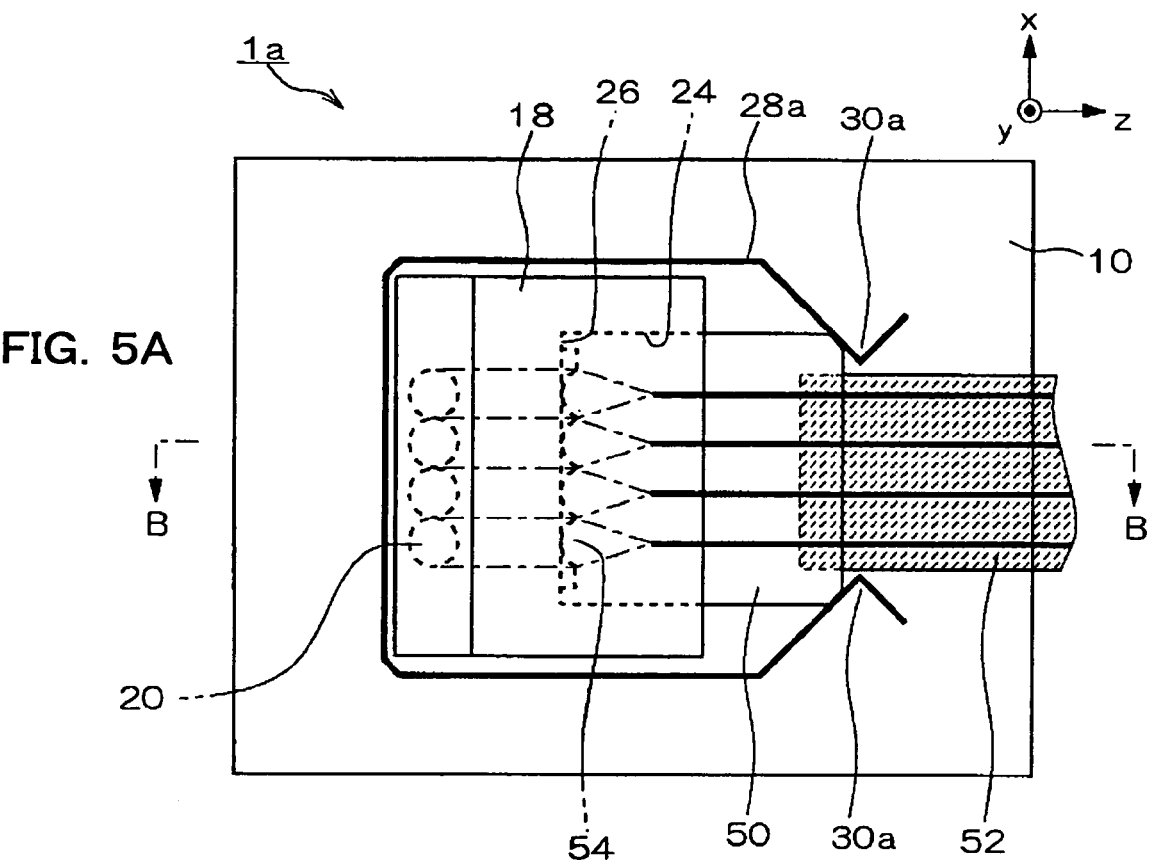
FIGS. 5(A) and 5(B) are views illustrating an optical module according to a second exemplary embodiment.
Figure 5B:
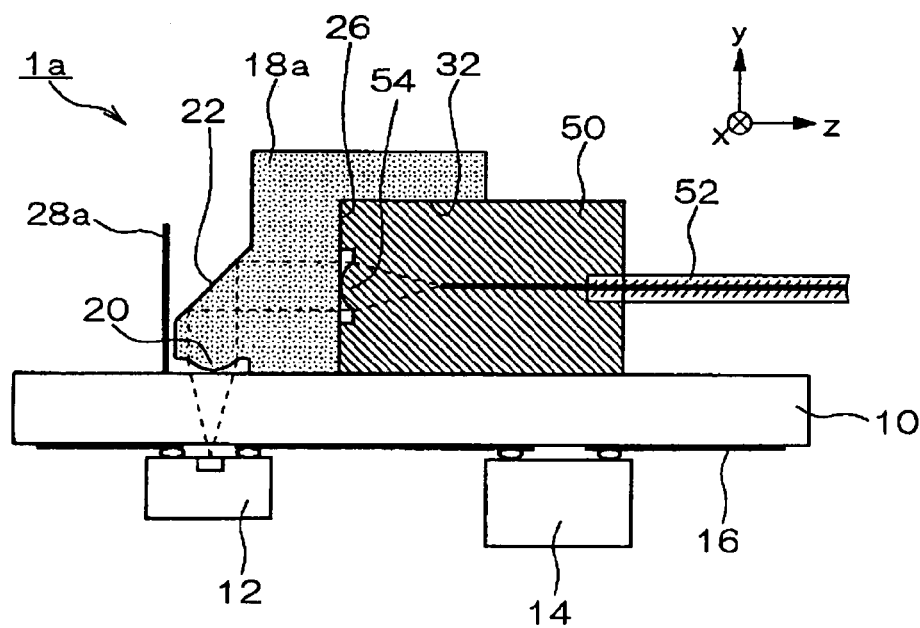

FIGS. 5(A) and 5(B) are views illustrating a configuration of an optical module according to a second exemplary embodiment. FIG. 5(A) is a plan view of the optical module of the present exemplary embodiment. FIG. 5(B) is a cross sectional view taken along the plane B—B of FIG. 5(A). An optical module 1*a* shown in the figures basically has a similar configuration to that of the optical module 1 according to the first exemplary embodiment, and common components are indicated by the same reference numerals and signs. Hereinafter, differences will be mainly described.

In the optical module 1*a* shown in FIGS. 5(A) and 5(B), an optical socket 18*a*, to which the optical plug 50 is attached, has a different shape from that of the first exemplary embodiment. The optical socket 18*a* includes the surfaces 24 and the surface 26 serving as guide surfaces similarly to the optical socket 18, further including a surface 32 for positioning in the Y axis direction of the optical module 1*a*. The surface 32 is formed substantially in parallel to the X-Z plane to position the optical plug 50 in the Y axis direction by setting the surface 32 and the top surface of the transparent substrate 10 as reference. Furthermore, by making the distance between the surface 32 and the transparent substrate 10 slightly smaller than the thickness of the optical plug 50 in the Y axis direction, it is possible for a part of the optical socket 18*a* including the surface 32 to bias the top surface of the optical plug 50 toward the transparent substrate 10 side. In such a case, the optical socket 18*a* including the surface 32 can also be considered to be the "pressing device".

Furthermore, a leaf spring 28*a* provided in the optical module 1*a* according to the present exemplary embodiment is configured to surround the socket 18*a* and the optical plug 50 and be provided with a hook portion 30*a* on one end thereof. The hook portion 30*a* holds a fitting state of the optical plug 50 and the optical socket 18*a* to prevent coming off of the optical plug 50. The hook portion 30*a* corresponds to the "locking device".

Third Exemplary Embodiment

Figure 6A:
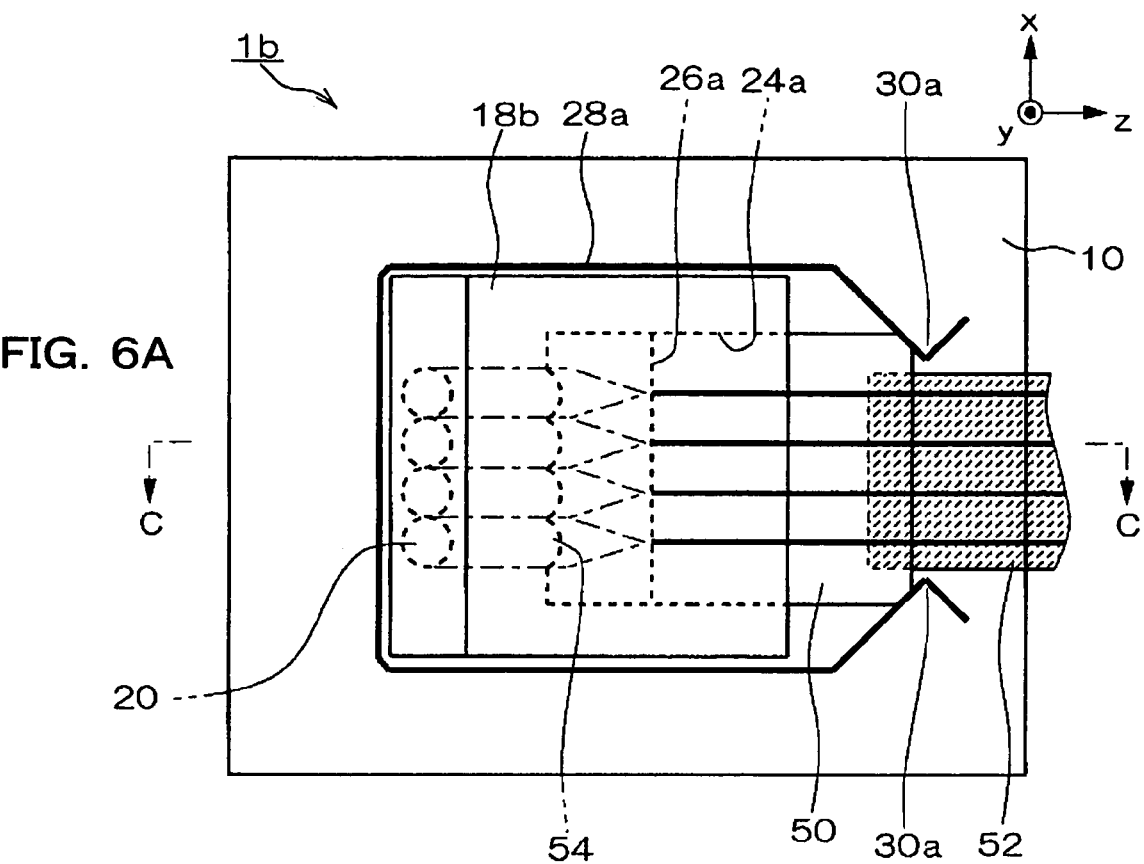
FIGS. 6(A) and 6(B) are views illustrating an optical module according to a third exemplary embodiment.
Figure 6B:
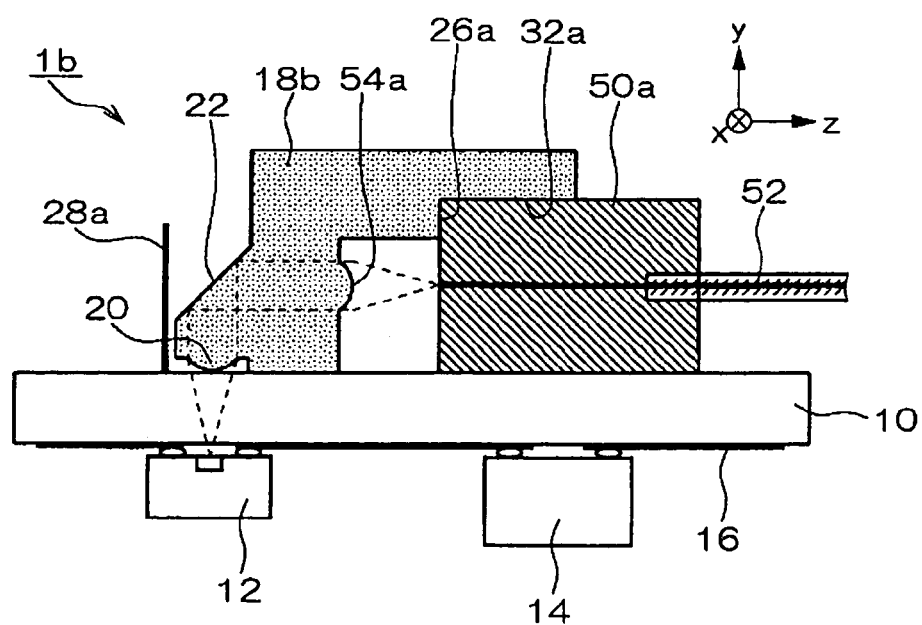

FIGS. 6(A) and 6(B) are views illustrating a configuration of an optical module according to a third exemplary embodiment. FIG. 6(A) is a plan view of the optical module of the present exemplary embodiment. FIG. 6(B) is a cross sectional view taken along the plane C—C of FIG. 6(A). An optical module 1*b* shown in the figures has a similar configuration to that of the above-described optical modules, and common components are indicated by the same reference numerals and signs. Hereinafter, differences will be mainly described.

In the optical module 1*b* shown in FIGS. 6(A) and 6(B), the optical socket 18*b*, to which the optical plug 50 is attached, has a different shape from those of the above-described exemplary embodiments. An optical socket 18*b* according to the present exemplary embodiment has surfaces 24*a*, a surface 26*a* and a surface 32*a* serving as guide surfaces. Respective functions of the surfaces 24*a*, 26*a* and 32*a* are similar to those of the above-described surfaces 24, 26 and 32.

Furthermore, in the present exemplary embodiment, because a lens 54*a* is formed as a second lens on the optical socket 18*b* side, the configuration of the optical plug 50*a* is simplified more than that of the optical plug 50 according to the above-described exemplary embodiments. This can reduce the cost. In addition, by forming a surface of the optical socket 18*b* on which the lens 54*a* is formed and the surface 32*a* serving as a guide surface independently, an optical distance between the lens 54*a* and a fiber core of the tape fiber 52 supported by the optical plug 50*a* is secured and an end surface of the fiber core is protected. A protection layer or the like to protect the tape fiber 52 may be provided at an end surface of the optical plug 50*a*.

Fourth Exemplary Embodiment

Figure 7A:
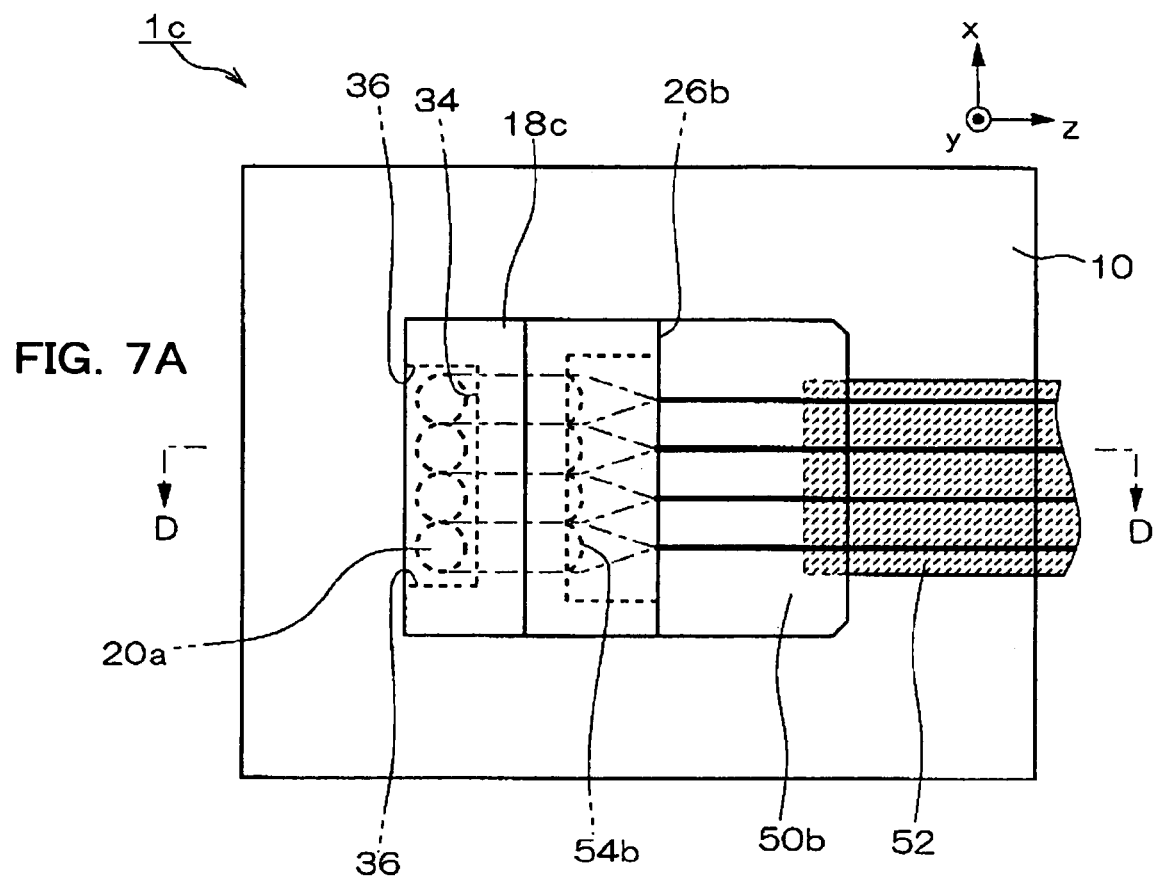
FIGS. 7(A) and 7(B) are views illustrating an optical module according to a fourth exemplary embodiment.
Figure 7B:
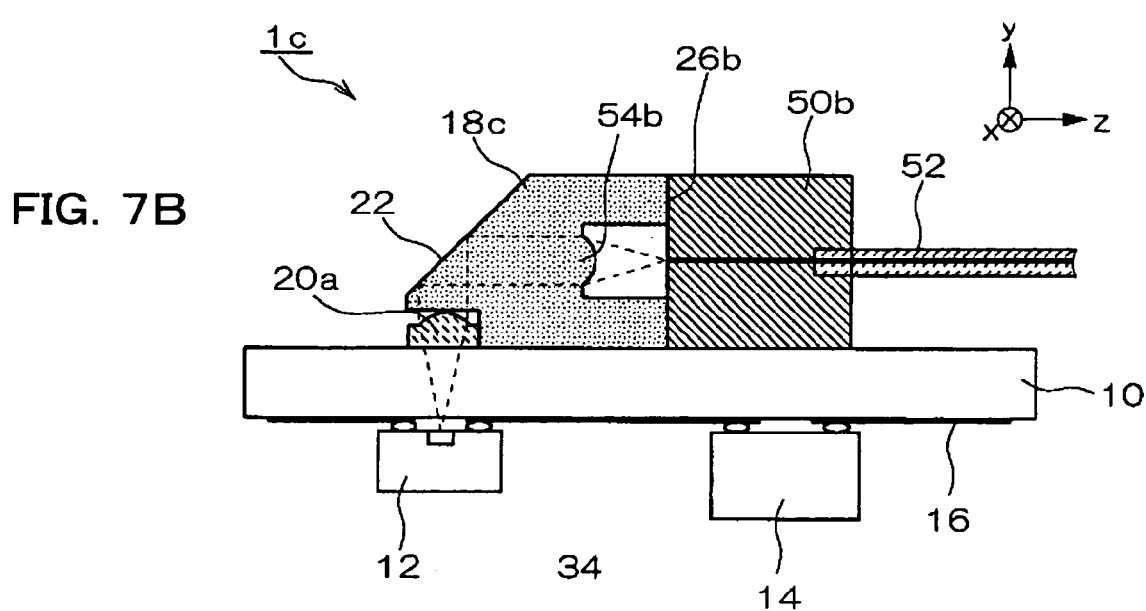

FIGS. 7(A) and 7(B) are views illustrating a configuration of an optical module according to a fourth exemplary embodiment. FIG. 7(A) is a plan view of the optical module of the present exemplary embodiment. FIG. 7(B) is a cross sectional view taken along the plane D—D of FIG. 7(A). An optical module 1*c* shown in the figures has a similar configuration to that of the above-described optical modules, and common components are indicated by the same reference numerals and signs. Hereinafter, differences will be mainly described.

The optical module 1*c* shown in the FIGS. 7(A) and 7(B) has a configuration in which an optical plug 50*b* and an optical socket 18*c* are attached directly. Specifically, the optical socket 18*c* has a surface 26*b* serving as a guide surface, and the surface 26*b* and an abutting surface provided in the optical plug 50*b* are stuck to attach the optical plug 50*b*.

Furthermore, in the present exemplary embodiment, because a lens 54*b* is formed as a second lens on the optical socket 18*c* side, the configuration of the optical plug 50*b* is simplified. This can reduce the cost. In addition, by forming a surface of the optical socket 18*c*, on which the lens 54*b* is formed, and the surface 26*b* serving as a guide surface independently so as to form a cavity, an optical distance between the lens 54*b* and a fiber core of the tape fiber 52 supported by the optical plug 50*b* is secured and an end surface of the fiber core is protected. A protection layer or the like for protecting the tape fiber 52 may be provided at an end surface of the optical plug 50*b*.

Furthermore, a lens 20*a* serving as a first lens is arranged as a lens array including four lenses at positions on the top surface of the transparent substrate 10, which face the optical element 12. The optical socket 18*c* has surfaces 34 and 36 serving as guide surfaces and by making these surfaces 34 and 36 abut on the above-described lens array, the optical socket 18*c* is positioned.

Fifth Exemplary Embodiment

Figure 8A:
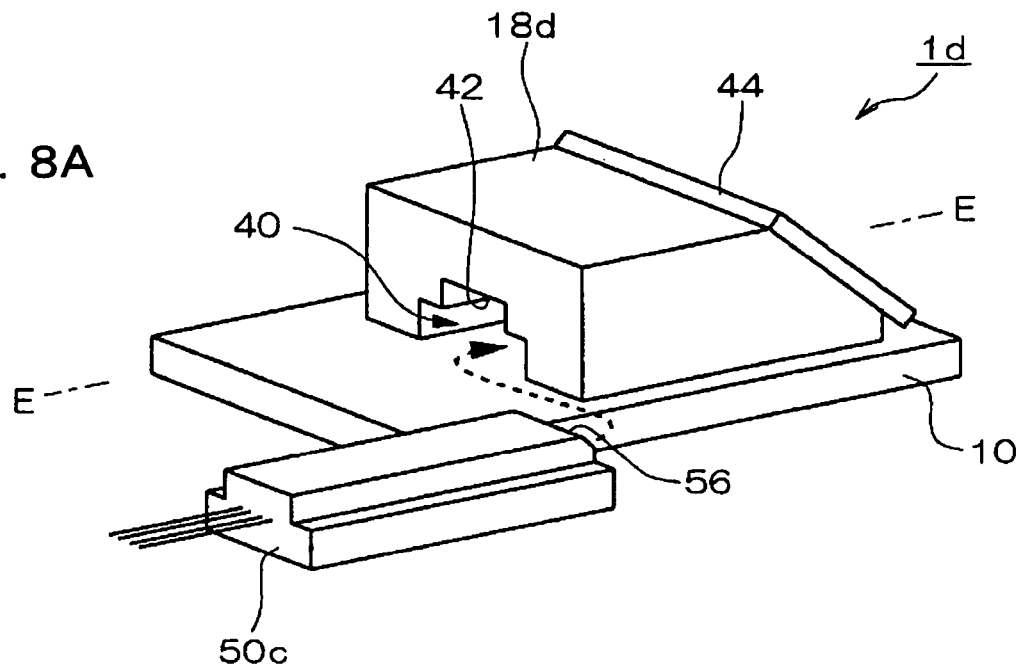
FIGS. 8(A) and 8(B) are views illustrating an optical module according to a fifth exemplary embodiment.
Figure 8B:
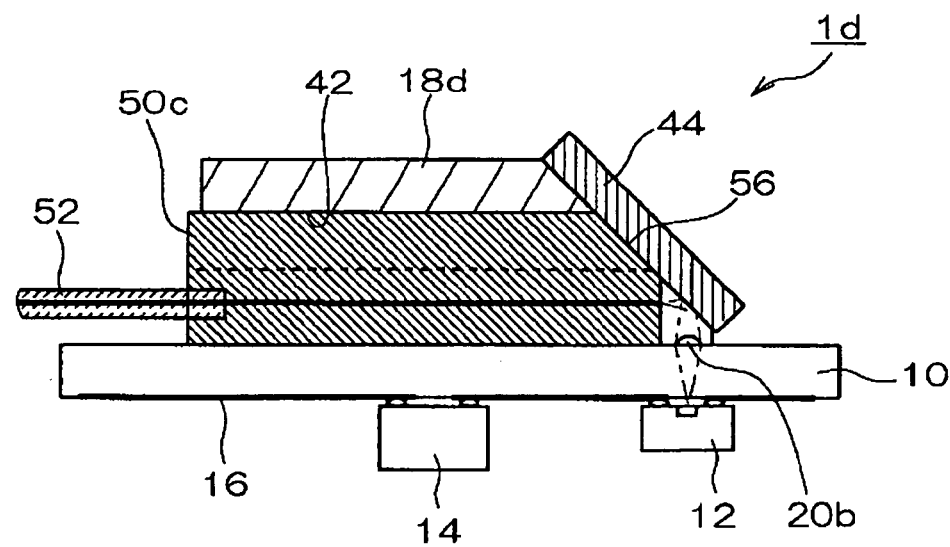

FIGS. 8(A) and 8(B) are views illustrating a configuration of an optical module according to a fifth exemplary embodiment. FIG. 8(A) is a perspective view of the optical module of the present exemplary embodiment. FIG. 8(B) is a cross sectional view taken along the plane E—E of FIG. 8(A). An optical module 1*d* shown in the figures has a similar configuration to that of the above-described optical modules, and common components are indicated by the same reference numerals and signs. Hereinafter, differences will be mainly described.

In an optical module 1*d* shown in FIGS. 8(A) and 8(B), an optical socket 18*d*, to which an optical plug 50*c* is attached, has a different shape from those of the above-described exemplary embodiments. The optical socket 18*d* has a fitting hole 40, which has a cross section of an inverted T shape, and the optical plug 50*c* also has a cross section of an inverted T shape corresponding to the shape of the fitting hole 40. The fitting hole 40 includes a guide groove 42 for guiding the direction in insertion of the optical plug 50*c*. The guide groove 42 includes a surface substantially parallel to the top surface of the transparent substrate 10 and surfaces substantially orthogonal to the top surface of the transparent substrate 10, and penetrates from one end of the optical socket 18*d* to the other end of the optical socket 18*d*. The guide groove 42 allows the optical plug 50*c* to be inserted into the optical socket 18*c* more smoothly.

Furthermore, a reflector plate 44 (reflective portion) is arranged on the one end of the optical socket 18*d*, and a lens 20*b* serving as a first lens is arranged at positions on the top surface of the transparent substrate 10, which face the optical element 12. The reflector plate 44 is arranged in such a manner that a reflective surface thereof is arranged at an angle of substantially 45 degrees with the top surface of the transparent substrate 10 and changes a path of signal light emitted from the optical element 12 at substantially 90 degrees to guide it to the tape fiber 52, or changes a path of signal light emitted from the tape fiber 52 at substantially 90 degrees to guide it to the optical element 12. The reflector plate 44 can be obtained, for example, by forming a metal layer on a glass substrate using a thin-layer forming method, such as a deposition, plating, sputtering method, or the like. In addition, the reflector plate 44 according to the present exemplary embodiment functions as a reference position to determine a position in the insertion direction when the optical plug 50*c* is inserted. The optical plug 50*c* is provided with an abutting surface 56 with an angle of substantially 45 degrees at a position where the optical plug 50*c* and the reflector plate 44 abut on each other. The abutting surface 56 is provided above a part where the fiber core of the tape fiber 52 is exposed. This prevents an end surface of the fiber core from contacting other members or the like, and secures an optical distance between the end surface of the fiber core and the reflector plate 44 to protect the end surface of the fiber core.

In particular, in the case where an optical receiving module is composed using a light-receiving element as the optical element 12, a distance from the end surface of the fiber core of the tape fiber 52 to the lens 20*b* via the reflector plate 44 becomes long and if a beam diameter of signal light becomes relatively larger with respect to a lens diameter. A decrease in optical coupling efficiency or mutual interference (crosstalk) with an adjacent channel (optical system including another optical element 12) can easily occur. Therefore, optimization of focal length becomes important. The optimization of focal length depends on a lens diameter (lens pitch) of the lens 20*b* and a divergence angle of emitted beam from the fiber core. For example, in the case where the pitch of the lens 20*b* is 0.25 mm and the divergence angle of the emitted beam is eleven degrees at half value, the focal length needs to be about 0.64 mm in order to prevent the emitted beam from entering another adjacent lens 20*b*. In the present exemplary embodiment, the shape and the arrangement of the above-described reflector plate 44 are set so as to satisfy this focal length.

As described above, because the present exemplary embodiment provides the configuration, in which the optical plug 50*c* abuts on the reflector plate 44 arranged at the one end of the optical socket 18*d*, a distance from an end surface of the optical plug 50*c* to a reflective position on the reflective surface of the reflector plate 42 and a distance from the reflective position to the lens 20*b* can be shortened (that is, the light path is shortened). Furthermore, in the present exemplary embodiment, because the guide groove 42 provided in the socket 18*d* is configured to penetrate from the one end of the optical socket 18*d* to the other end of the optical socket 18*d*, high-precision machining can be easily performed by cutting or the like, which brings about an advantage of easily realizing a high-precision of fitting position of the optical plug 50*c* and the optical socket 18*d*.

In the present exemplary embodiment, the second lens to converge signal light emitted from the tape fiber 52 may also be provided on the one end side of the optical plug 50*c*.

Sixth Exemplary Embodiment

Next, an opto-electrical hybrid integrated circuit composed of the optical modules described in the above exemplary embodiments and a circuit board composed of the opto-electrical hybrid integrated circuit will be described. Hereinafter, a case where the optical module 1*a* is used is illustrated, but the other optical modules may be used.

Figure 9:
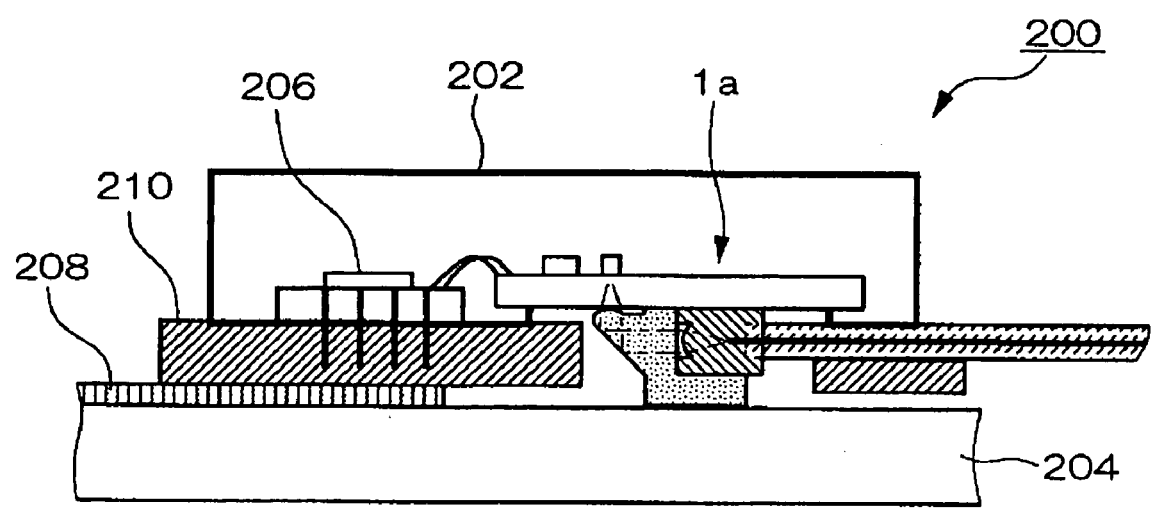
FIG. 9 is a view illustrating a configuration example of an opto-electrical hybrid integrated circuit and a circuit board including the integrated circuit.

FIG. 9 is a view illustrating a configuration example of an opto-electrical hybrid integrated circuit or a circuit board including the integrated circuit. A circuit board 200 shown in the figure includes an opto-electrical hybrid integrated circuit 202 including the optical module 1*a* according to the above-described exemplary embodiment and a wiring substrate 204.

The opto-electrical hybrid integrated circuit 202 includes the optical module 1*a* and a signal processing chip 206, both of which are integrally molded using plastic or the like. The optical module 1*a* and the signal processing chip 206 are electrically coupled by wire bonding. The optical module 1*a* is arranged in such a manner that emitted light from the optical element is guided to the wiring substrate 204 side. The optical socket provided in the optical module 1*a* is exposed from a mold resin, which is in a state to be able to be coupled with an optical plug. The wiring substrate 204 is provided with a wiring layer 208 thereon and the opto-electrical hybrid integrated circuit 202 is placed thereon. A socket 210 is arranged on the top surface of the wiring substrate 204. By inserting a pin grid array (PGA) provided in the opto-electrical hybrid integrated circuit 202 into the socket 210, the opto-electrical hybrid integrated circuit 202 is fixed.

Figure 10:
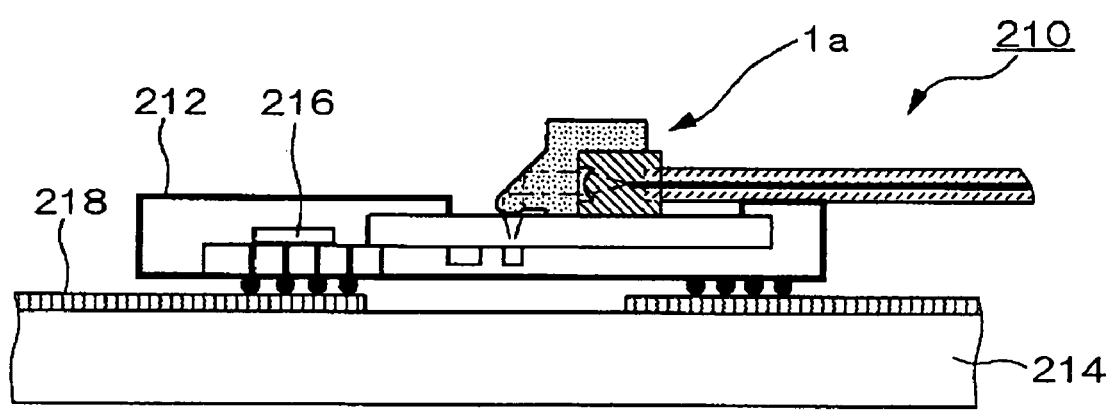
FIG. 10 is a view illustrating another configuration example of an opto-electrical hybrid integrated circuit and a circuit board including the integrated circuit.

FIG. 10 is a view illustrating another configuration example of an opto-electrical hybrid integrated circuit or a circuit board including the integrated circuit. A circuit board 210 shown in the figure includes an opto-electrical hybrid integrated circuit 212 including the optical module 1a according to the above-described exemplary embodiment and a wiring substrate 214.

The opto-electrical hybrid integrated circuit 212 includes the optical module 1a and a signal processing chip 216, both of which are integrally molded using plastic or the like. The optical module 1a is arranged in such a manner that emitted light from the optical element is guided to the direction opposite to the wiring substrate 214 side. The optical socket provided in the optical module 1a is exposed from a mold resin, which is in a state to be able to be coupled with an optical plug. The wiring substrate 214 is provided with a wiring layer 218 at an upper part thereof and the opto-electrical hybrid integrated circuit 212 is placed thereon. The opto-electrical hybrid integrated circuit 212 is coupled to the wiring substrate 214 by a ball grid array (BGA).

The opto-electrical integrated circuits and circuit boards according the exemplary embodiments can be applied to various electronic apparatuses, such as a personal computer, and used for information communication inside of an apparatus or with external apparatuses or the like.

Modified Exemplary Embodiment

The present invention is not limited to the contents of the above-described exemplary embodiments, but various modifications can be made within the scope of the present invention. For example, although according to the above-described exemplary embodiments, the positioning of the optical plug is performed by the guide surfaces provided in the optical socket, a projection portion may be provided inside of a fitting hole (a space to which the optical plug is inserted) of the optical socket to bias the optical plug for positioning by the projection portion.

Figure 11A:
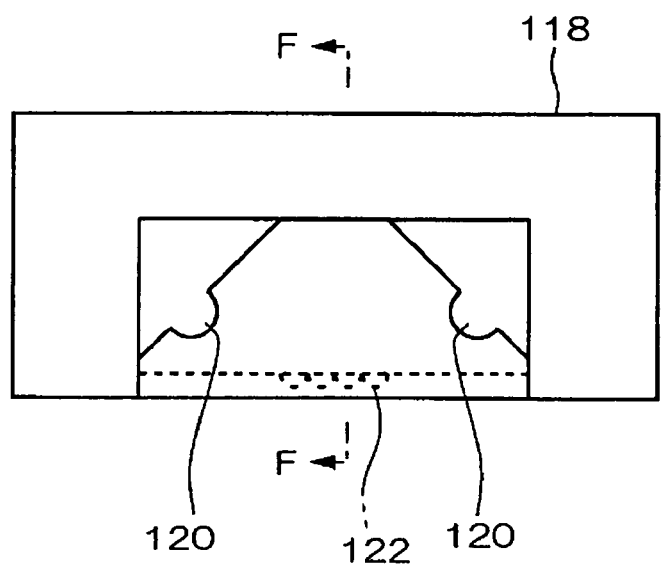
FIGS. 11(A) and 11(B) are views illustrating a configuration example of an optical socket in the case where an optical plug is positioned by a projection portion.
Figure 11B:
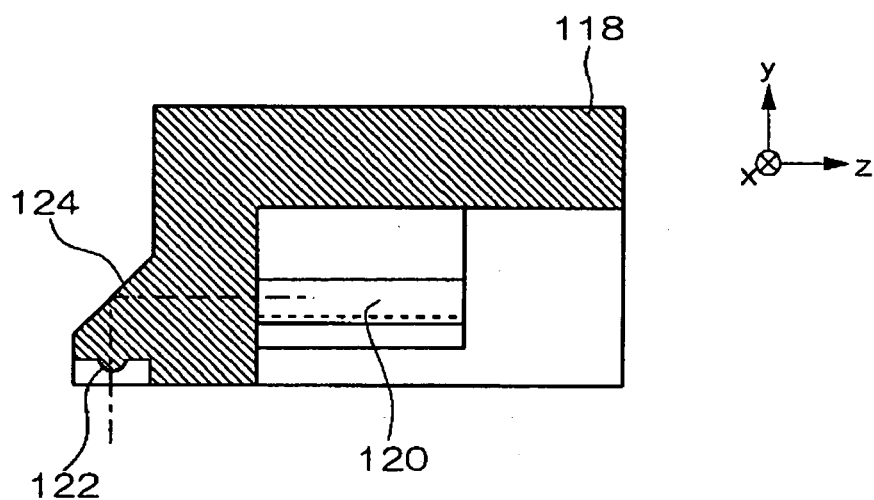

FIGS. 11(A) and 11(B) are views illustrating a configuration example in the case where the optical plug is positioned using the projection portion. FIG. 11(A) is a plan view, when an optical socket 118 according to the modified exemplary embodiment is viewed from the opening side of the fitting hole, into which the optical plug is inserted. FIG. 11(B) is a cross sectional view taken along the plane F-F of FIG. 11(A).

The optical socket 118 shown in FIGS. 11(A) and 11(B) has inclined surfaces inside of the fitting hole, into which the optical plug is to be inserted, and the inclined surfaces are provided with a projection portion 120, which extends in the direction substantially parallel to the Z axis and has a semicircular cross section. The projection portion 120 has a function of contacting an abutting surface formed on the optical plug corresponding to the projection portion 120 (a detail will be described later) to bias the abutting surface. Furthermore, on the other end side of the optical socket 118 according to the modified exemplary embodiment, a lens 122 and a reflective portion 124 are integrally formed. The optical socket 118 can be used, for example, in place of the above-described optical socket 18a in the optical module 1a of the above-described second exemplary embodiment.

Figure 12A:
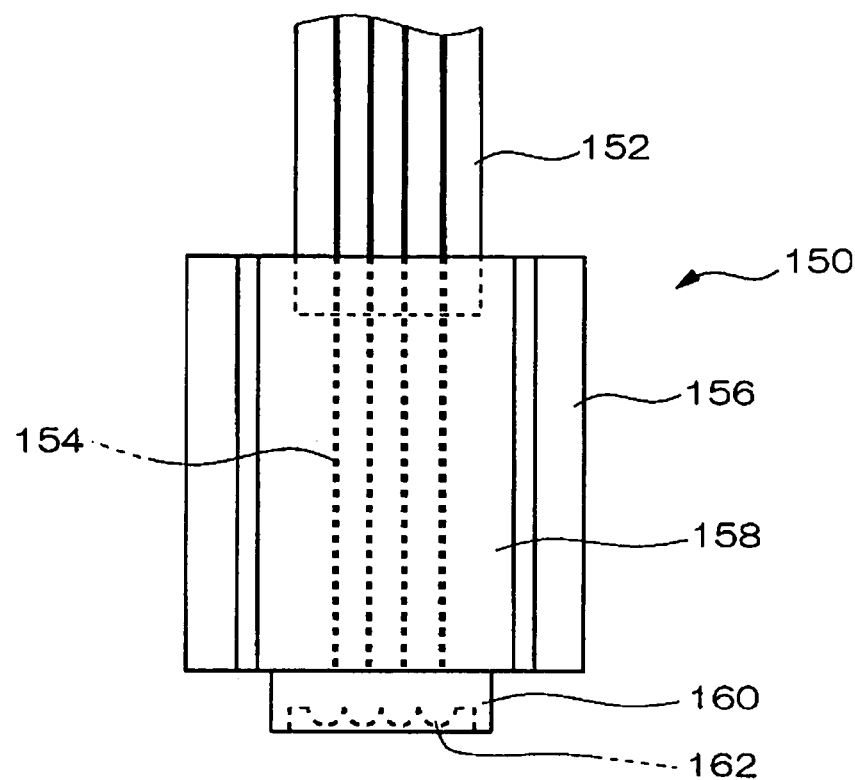
FIGS. 12(A)–12(C) are views illustrating a configuration example of an optical plug.
Figure 12B:
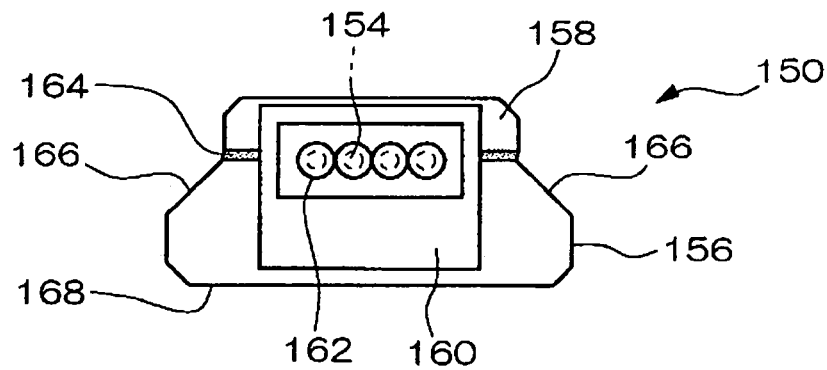
Figure 12C:
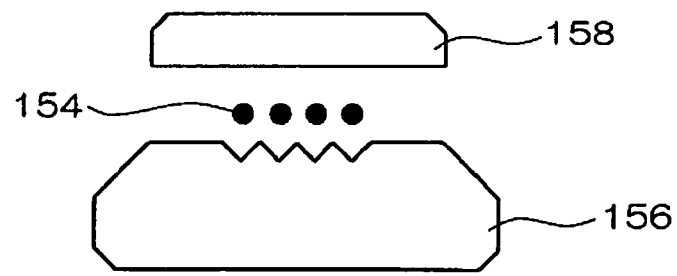

FIGS. 12(A)–12(C) are views illustrating a configuration example of an optical plug, which is preferably used in combination with the optical socket 118 shown in FIGS. 11(A) and 11(B). FIG. 12(A) is a plan view, when an optical plug 150 is viewed from the upper side. FIG. 12(B) is a front view of the optical plug 150. FIG. 12(C) is a front view, in which components are disassembled for illustrating the configuration of the optical plug 150.

The optical plug 150 shown in FIGS. 12(A)–12(C) supports one end of a tape fiber 152 and includes a base 156, an upper plate 158, a lens support member 160, and a plurality of lenses 162. As shown in FIG. 12(C), there is provided a configuration in which the base 156 has a V-shaped groove. A fiber clad 154 of the tape fiber 152 is placed along the V-shaped groove and the upper plate 158 is placed over the fiber clad 154 so as to sandwich the fiber clad 154 between the upper plate 158 and the base 156.

As shown in FIG. 12(B), the base 156 and the upper plate 158 are adhered using adhesive 164. The lens support member 160 is adhered to an end of a combined body of the base 156 and the upper plate 158. The four lenses 162 are formed integrally with the lens support member 160, and the lens support member 160 is positioned and adhered so as to achieve optical coupling of the lenses 162 and the fiber core 154. Surfaces 166 provided in the base 156 are abutting surfaces corresponding to the above-described projection portion 120 of the optical plug 118, and the surfaces 166 are biased by the projection portion 120. A bottom surface 168 of the base 156 is placed while abutting on the top surface of the transparent substrate 10 and the surfaces 166 are biased by the projection portion 120, thereby the position of the optical plug 150 inside of the optical socket 118 is determined.

Figure 13A:
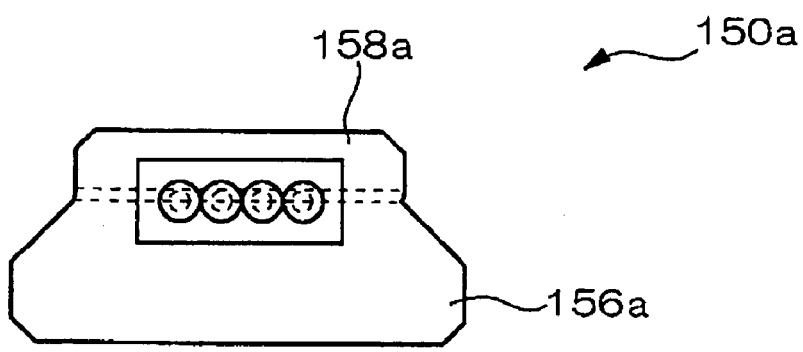
FIGS. 13(A) and 13(B) are views illustrating another configuration example of an optical plug.
Figure 13B:
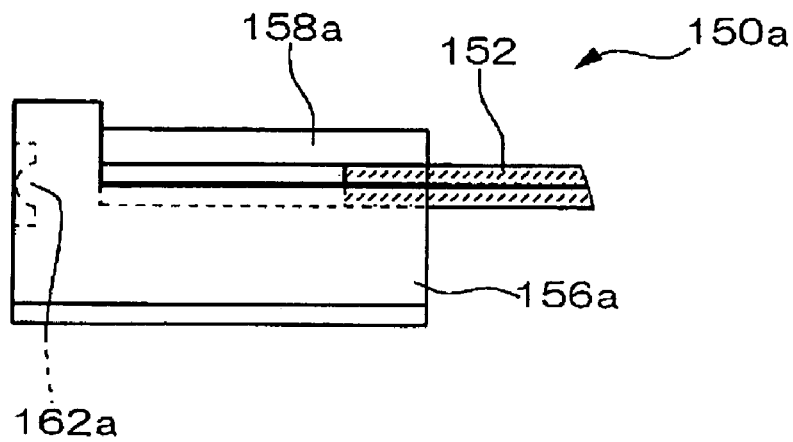

FIGS. 13(A)–13(B) are views illustrating another configuration example of an optical plug, which is preferably used in combination with the optical socket 118 shown in FIGS. 11(A)–11(B). An optical plug 150a, shown as an example in FIGS. 13(A)–13(B), has the same basic configuration as that of the optical plug 150 shown in the above-described FIGS. 12(A)–12(C), but it is different from that of the optical plug 150 in that a base 156a and lenses 162a are integrally formed and the fiber clad 154 of the tape fiber 152 is sandwiched by the base 156a and an upper plate 158a. Employing such a configuration can reduce the number of components and simplify the manufacturing process.

In the above-described exemplary embodiments, the opto-electrical hybrid circuits and the circuit boards including the circuit (opto-electrical hybrid circuit board) are exemplified as applications of the optical module according to an aspect of the present invention, but the applicable scope of the optical module of an aspect of the present invention is not limited to these, and the optical module of an aspect of the present invention can be included in various electronic apparatus and applied to an optical transceiver (optical communication device) or the like for use in optical communication between electronic apparatus.

What is claimed is:

1. An optical module, to which an optical plug that is part of an optical transmission path is attached, so as to transmit and receive signal light via the optical transmission path for information communication, comprising:
   a transparent substrate having light transmittance properties with respect to a wavelength of a signal light;
   an optical socket, which is arranged on one side of the transparent substrate and to which the optical plug is attached, the optical socket having guide surfaces to position the optical plug, the guide surfaces include two surfaces substantially parallel to each other and substantially orthogonal to the another surface of the transparent substrate, and one surface substantially parallel to the another surface of the transparent substrate;

an optical element, which is arranged on another side of the transparent substrate and emits the signal light to the one side of the transparent substrate according to a supplied electrical signal, or generates an electrical signal according to the intensity of the signal light supplied from the one side of the transparent substrate; and a reflective portion, which is arranged on the one side of the transparent substrate and changes a path of the signal light emitted from the optical element at substantially 90 degrees to guide the signal light to the optical transmission path, or changes a path of the signal light emitted from the optical transmission path at substantially 90 degrees to guide the signal light to the optical element.

2. The optical module according to claim 1, the reflective portion being formed in the optical socket.

3. The optical module according to claim 1, further comprising:

a first lens, which converges the signal light emitted from the optical element to guide the signal light to the reflective portion, or converges the signal light, emitted from the optical transmission path and reflected by the reflective portion, to guide the signal light to the optical element.

4. The optical module according to claim 3, the first lens being formed in the optical socket.

5. The optical module according to claim 3, the first lens being formed on the transparent substrate.

6. The optical module according to claim 1, further comprising:

a pressing device to press the optical plug to the other side of the transparent substrate.

7. The optical module according to claim 1, wherein the guide surfaces include two surfaces substantially orthogonal to each other and arranged at an angle of substantially 45 degrees with respect to the another surface of the transparent substrate.

8. The optical module according to claim 7, each of the two surfaces having a projection portion to bias the optical plug.

9. The optical module according to claim 1, further comprising:

a locking device to hold a state, in which the optical plug is fitted into the optical socket.

10. The optical module according to claim 1, the optical socket having a guide groove to position the optical plug.

11. The optical module according to claim 10, the guide groove includes a surface substantially parallel to the one surface of the transparent substrate and surfaces substantially orthogonal to the one surface and penetrates from one end of the optical socket to the other end of the optical socket.

12. A manufacturing method of an optical module, comprising:

forming a wiring layer in a plurality of regions on one side of a transparent substrate having light transmittance properties;

arranging an optical element on the one side of the transparent substrate corresponding to each wiring layer;

mounting an optical socket, corresponding to the optical element, on another side of the transparent substrate, the optical socket being adapted to guide a signal light to or from a lens formed in an optical plug, and having guide surfaces to position the optical plug, the guide surfaces include two surfaces substantially parallel to each other and substantially orthogonal to the another side of the transparent substrate, and one surface substantially parallel to the another side of the transparent substrate; and cutting and dividing the transparent substrate into the plurality of regions.

13. An optical communication device, comprising:
the optical module according to claim 1.

14. An opto-electrical hybrid integrated circuit, comprising:
the optical module according to claim 1.

15. A circuit board, comprising:
the optical module according to claim 1.

16. An electronic apparatus, comprising:
the optical module according to claim 1.

17. The optical module according to claim 3, the first lens being arranged on the one side of the transparent substrate and including a convex portion arranged on the transparent substrate.

* * * * *